United States Patent [19]
Massie

[11] Patent Number: 5,811,889
[45] Date of Patent: Sep. 22, 1998

[54] METHOD AND APPARATUS FOR REDUNDANCY CIRCUITS USING POWER FETS

[75] Inventor: Harold L. Massie, West Linn, Oreg.

[73] Assignee: Intel Corporation, Snata Clara, Calif.

[21] Appl. No.: 613,375

[22] Filed: Mar. 11, 1996

[51] Int. Cl.$^6$ .............................. H02J 1/10; H01H 47/00
[52] U.S. Cl. ............................ 307/44; 307/125; 307/139
[58] Field of Search .................................. 307/43, 44, 64, 307/65, 112, 116, 125, 139, 140; 363/20, 21

[56] References Cited

U.S. PATENT DOCUMENTS

| | | | |
|---|---|---|---|
| 4,617,473 | 10/1986 | Bingham | 307/66 |
| 4,621,311 | 11/1986 | O'Brien | 363/21 |
| 4,638,175 | 1/1987 | Bradford et al. | 307/64 |
| 5,162,663 | 11/1992 | Combs et al. | 307/29 |
| 5,504,411 | 4/1996 | McCaleb et al. | 320/2 |

*Primary Examiner*—Jeffrey A. Gaffin
*Assistant Examiner*—Jonathan S. Kaplan
*Attorney, Agent, or Firm*—Blakely, Sokoloff, Taylor & Zafman

[57] ABSTRACT

A circuit used in combination with a redundant power supply system to electrically disconnect its failed power supplies. The circuit comprises a power FET, a rectifier and filter circuit, a start-up circuit and a shut-down circuit. The rectifier and filter circuit rectifies an input AC waveform and subsequently filters a resultant DC voltage which is subsequently used to supply an output voltage at an output terminal connected to the power FET. In parallel with the rectifier and filter circuit, the start-up circuit is coupled to a gate of the power FET to ramp the voltage supplied to that gate slowly turning on the power FET. Coupled in parallel with the start-up circuit, the shut-down circuit conducts voltage from the gate thereby turning-off the power FET to preclude current from other power supplies of the redundant power supply system to pass current to its failed power supply.

20 Claims, 3 Drawing Sheets

METHOD AND APPARATUS FOR REDUNDANCY CIRCUITS USING POWER FETS

BACKGROUND OF THE INVENTION

1. Field of the Invention

The present invention relates to the field of electronic circuitry. More particularly, the present invention relates to a circuit implemented in association with a redundant power supply system to electrically disconnect a respective power supply that has failed.

2. Description of Art Related to the Invention

It is well known that certain electronic systems are implemented with multiple power supplies that provide power, namely output voltages and load currents, to one or more of its printed circuit boards. Traces on the printed circuit board dedicated as power lines transfer the output voltages and load currents to components connected to the printed circuit board. These power supplies may be arranged in a redundant fashion in which multiple power supplies are dedicated to collectively produce a requisite output voltage and load current as shown in FIG. 1.

In FIG. 1, a redundant power supply system 100 that produces output voltage "$V_{out}$" is shown. The redundant power supply system 100 includes a plurality of power supplies 110a–110n ("n" being arbitrary) coupled to a redundancy control circuit 120 that enables $V_{out}$ to be maintained even if one or perhaps more of the power supplies 110a–110n fail. As shown, the redundancy control circuit 120 is a plurality of OR'ing diodes 125a-125n in which the anode of each diode 125a–125n is uniquely coupled to one of the plurality of power supplies 110a–110n and its cathode is coupled to a common node 130. This prevents $V_{out}$ from dropping below a minimum specified voltage level in the event that one of the plurality of power supplies 110a–110n fails. Instead, the remaining power supplies that are in operation provide larger load currents in order to compensate for the current loss of the failed power supply and maintain the output voltage at $V_{out}$.

Although this configuration of the redundancy control circuit 120 using OR'ing diodes is effective for a redundant power supply system, it has a number of disadvantages. One disadvantage is each diode 125a–125n imposes a voltage drop of approximately 0.4 volts ("V"). In light of the fact that the sum of the power supplies are collectively providing voltage levels of +3.3 V and +5 V, the combined voltage drop experienced by the power supplies of a redundant power supply system is quite significant. Hence, the conventional redundant power supply systems are somewhat inefficient and subject to potential thermal dissipation concerns since multiple diodes are implemented within the chassis of the computer system. Another disadvantage is that using discrete diode components is somewhat more expensive than the circuitry utilized by the present invention.

SUMMARY OF THE INVENTION

The present invention relates to a circuit used in combination with a redundant power supply system to electrically disconnect its failed power supplies. The circuit comprises a power FET, a rectifier and filter circuit, a start-up circuit and a shut-down circuit. The rectifier and filter circuit is coupled to a secondary winding of a transformer to rectify an AC waveform and subsequently filter a resultant DC voltage. The DC voltage is supplied to a source of the power FET in an effort to produce an output voltage at an output terminal connected to a drain of the power FET.

Connected to be in parallel with the rectifier and filter circuit, the start-up circuit is coupled to the secondary winding and the gate of the power FET. At power-on of the power supply, it provides an output voltage through an internal diode of the power FET. The start-up circuit then ramps the voltage supplied to the gate of the power FET until its voltage substantially exceeds the DC voltage supplied to the source, which turns on the power FET. Thus, the internal diode of the power FET is shunted by the low "on" resistance of the power FET which allows a low voltage drop allowing load current to flow from the power supply to the output terminal. The slow turn-on of the power FET allows a smooth turn-on of the current sharing of the power supplies.

The shut-down circuit is also coupled to the secondary winding and the power FET in parallel with the start-up circuit. When the power supply is operating, it does not conduct voltage from the gate of the power FET. However, if the power supply fails, it conducts voltage from the gate thereby turning-off the power FET to preclude current from other power supplies of the redundant power supply system to pass current to the failed power supply.

BRIEF DESCRIPTION OF THE DRAWINGS

The features and advantages of the present invention will become apparent from the following detailed description of the present invention in which.

DESCRIPTION OF THE PREFERRED EMBODIMENT

A circuit and method for electrically disconnecting a failed power supply of a redundancy power supply system from adversely effecting a requisite output voltage applied a load is described herein. In order to provide a thorough understanding of the invention, certain specific details are set forth such as specific component interconnections and the like. It will be evident, however, to those skilled in the art that these specific details illustrate one of a number of embodiments that could be utilized by the present invention. In other instances, well known circuits have not been described in detail in order to avoid obscuring the present invention.

Figure 2A:
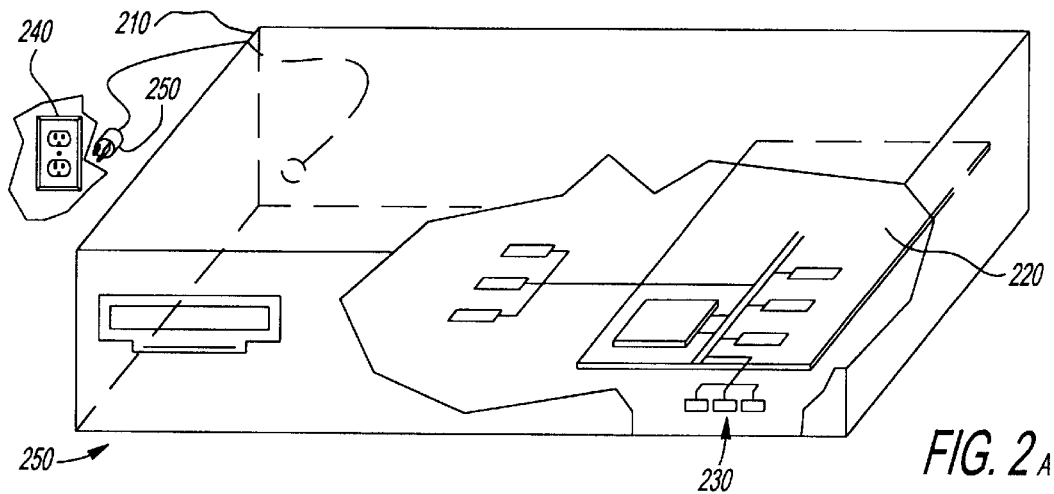
FIG. 2A is a block diagram of a first embodiment of a computer system employing a redundant power supply system utilizing the present invention.

Referring to FIG. 2A, a first illustrative embodiment of a general computer system incorporating the present invention is shown. The computer system 200 includes a chassis 210 housing a number of printed circuit boards such as, for example, a motherboard 220. The motherboard 220 is coupled to a plurality of redundant power supply systems 230 typically implemented off-board within the chassis 210.

Each redundant power supply system 230 receives AC power from a wall socket 240 via a power cord 250. Although not shown, the computer may further includes a display monitor, a cursor control device (e.g., mouse, trackball, touchpad, etc.), an alphanumeric keyboard and other peripherals (e.g., printers, plotters, modems, etc.), all of which are coupled to ports externally visible from the chassis 210.

As briefly mentioned above, redundant power supply systems 230 receive AC power usually from the wall socket 240 and produces various levels of DC power for use by its load normally being one or more electronic components (e.g., processor) connected to the printed circuit board. These levels of DC power may feature DC voltages of +12 V, +5 V and +3.3 V although other voltage ranges are not excluded. Each DC voltage level is supplied to the motherboard 220 through a respective common power line. The redundant power supply systems 230 are preferably coupled in close proximity to their respective load to reduce the resistance and inductance effect of their power line.

Figure 2B:
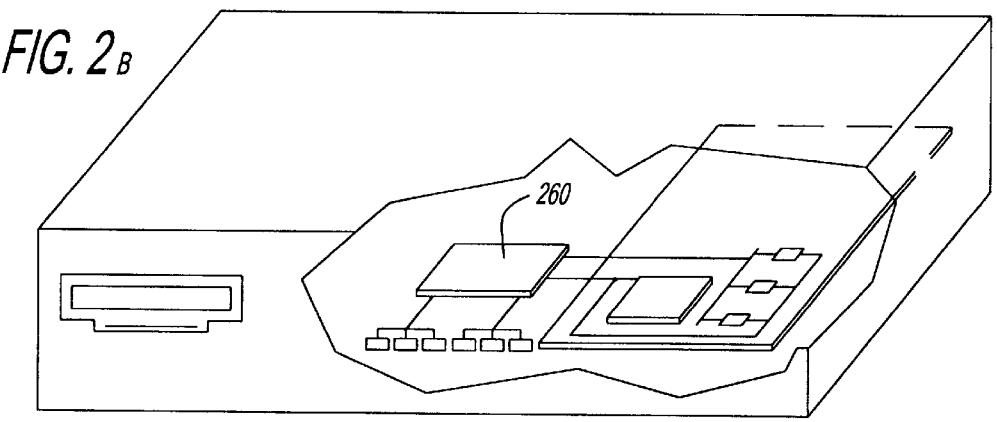
FIG. 2B is a block diagram of a second embodiment of a computer system employing the redundant power supply system utilizing the present invention.

Referring to FIG. 2B, a second illustrative embodiment of the computer system incorporating the present invention is shown. As in FIG. 2A, the computer system 200 features a plurality of printed circuit boards housed within the chassis 210 including the motherboard 220 and a power distribution circuit board 260. The power distribution circuit board 260 features a redundancy control circuit associated with each power supply of the redundancy power supply systems 230. This implementation avoids placement of the redundancy control circuit within the power supply or on the printed circuit board. The redundancy control circuit precludes current from propagating to one of the power supplies if it fails. In this embodiment, the power distribution circuit board 260 provides 3.3 V, 5 V and 12 V to the motherboard 220.

Figure 3:
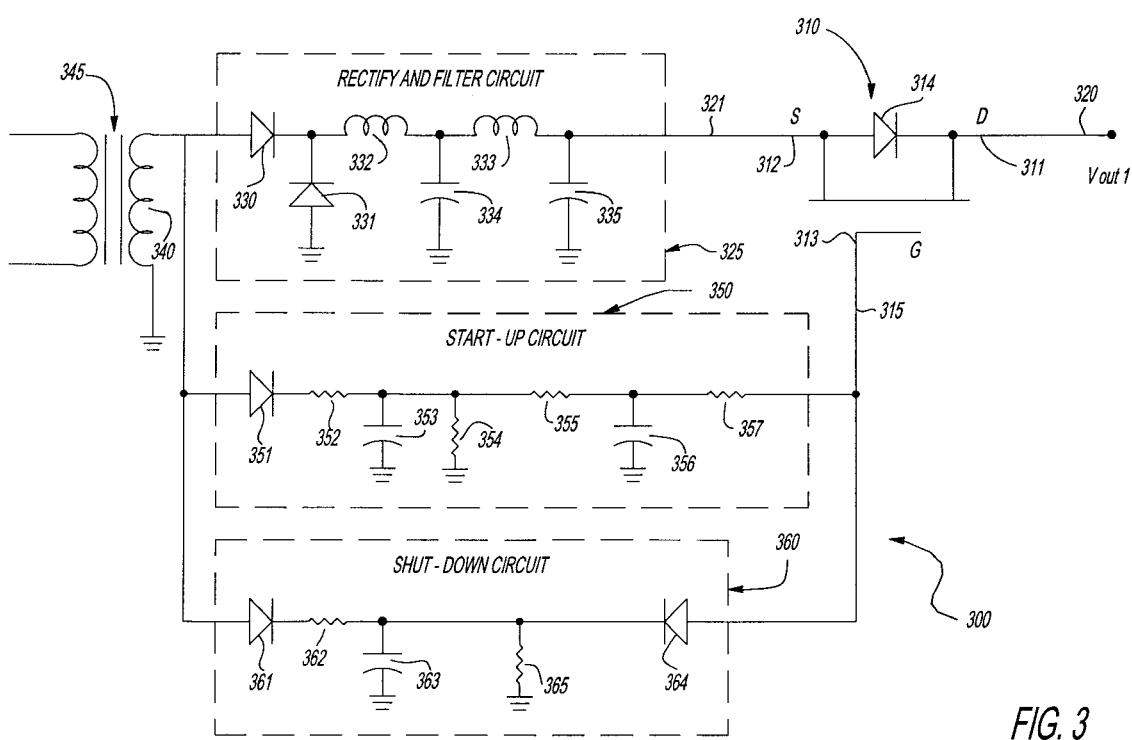
FIG. 3 is a block diagram of an improved redundancy control circuit utilized by the redundant power supply system to electrically disconnect a failed power supply from a load.

Referring now to FIG. 3, a circuit diagram of the redundancy control circuit 300 that electrically disconnects a failed power supply by precluding current from flowing back to a failed power supply is shown. The redundancy control circuit 300 is designed to avoid an appreciable power loss as denoted by the use of OR'ing diodes of FIG. 1. It is contemplated that the redundancy control circuitry 300 may be employed entirely within each power supply of the redundancy power supply system or partially employed within the power supply and on either the printed circuit board that is receiving power (e.g., a motherboard) or a power distribution board as shown in FIG. 2B.

The redundancy control circuit 300 includes a power FET 310 having a drain 311, source 312 and gate 313 as well as a rectify and filter circuit 325. With respect to its architecture, the drain 311 of the power FET 310 is coupled to an output terminal 320. The source 312 of the power FET 310 is coupled to a voltage bus line 321 that receives a DC voltage when the power supply is turned-on. This DC voltage is obtained by inputting an AC waveform from transformer 345 into the rectify and filter circuit 325. The rectify and filter circuit 325 includes a first diode 330 having its anode coupled to a secondary winding 345 of the transformer 345. The first diode 330 and a second diode 331 of the rectify and filter circuit 325 are used to rectify the AC waveform in order to produce the DC voltage which is subsequently filtered by inductors 332 and 333 and capacitors 334 and 335.

As shown in FIG. 3, the power FET 310 includes an internal diode 314 that is forward biased between its source 312 and drain 311. Thus, if a voltage "$V_{gate}$" applied to the gate 313 of the power FET 310 is substantially greater than the voltage applied to the source 312 of the power FET 310, the power FET 310 is turned on reducing the voltage drop across the internal diode 314 to a nominal value. This allows an output voltage "$V_{out1}$", equivalent to $V_{out}$ which is a combination of voltages provided by the operational power supplies of the system, to be applied to the output terminal 320 and load current to propagate through the power FET 310 and output voltage terminal 320. Otherwise, the power FET 310 is placed in an "Off" state allowing the internal diode 314 to preclude current from flowing through the power FET 310 to the voltage bus line 321. Such current could cause the combined output voltage to drop below the minimum voltage if the failing power supply has an internal component in the rectify and filter circuit 325 shorted.

As further shown in FIG. 3, the redundancy control circuit 300 includes a "start-up" circuit 350 and a "shut-down" circuit 360 situated in parallel with the start-up circuit 350. The purpose of the start-up circuit 350 is to slowly turn on the power FET 310 immediately after powering the power supply and to continue to supply power to the output terminal 320. This avoids a voltage surge on a gate line 315 coupled to the gate 313 of the power FET 310 which would quickly turn-on the power FET 310 and cause a voltage surge on the output terminal 320. In contrast, the shut-down circuit 360 is used to quickly turn off the power FET 310 in the event that the power supply fails to preclude a large current surge from propagating from the output terminal 320 to the rectify and filter circuit 325 through bus line 321. Such failure may be caused by an electronic component being shorted or any number of reasons.

The start-up circuit 350 is coupled between the secondary winding 340 of the transformer 345 and the gate line 315. The start-up circuit 350 includes a third diode 351 having its anode coupled to the secondary winding 340 of the transformer 345. A cathode of the third diode 351 is coupled to a first resistor 352 which, in turn, is coupled to a third capacitor 353, a second resistor 354 and third resistor 355. The other leads of the third capacitor 353 and second resistor 354 are coupled to ground. As the third capacitor 353 is charged to maintain a voltage, a fourth capacitor 356 coupled to the third resistor 355 and in parallel with the third capacitor 353 is charged at a time constant "K" which is equivalent to the resistance of the third resistor 355 multiplied by the capacitance of the fourth capacitor 356. The nominal values of the first-fourth resistors and third-fourth capacitors are approximately the following: 51 Ω, 100K Ω, 51K Ω, 10K Ω, 1 μF and 10 μF, respectively.

In general, the functionality of the components of the start-up circuit 350 are as follows. The first resistor 352 is used to limit the current through diode 351. The second resistor 354 is a discharge resistor for the third and fourth capacitors 353 and 356. The second resistor 355 and the fourth capacitor 356 form the charging time constant of the start-up circuit 350. Lastly, the fourth resistor 357 isolates the fourth capacitor 356 from the gate 315 of the power FET 310.

The shut-down circuit 360 is coupled to the second winding 340 of the transformer 345 and the gate line 315 for the power FET 310. The shut-down circuit 360 includes a fourth diode 361 having its anode coupled to the secondary winding 340 of the transformer 345. As current flows through the fourth diode 361 as well as the fifth resistor 362, it charges the fifth capacitor 363. This precludes a reversed-biased fifth diode 364 from conducting voltage away from the gate line 315 until the power supply is shut off or fails. This allows a sixth resistor 365 to discharge the fifth capacitor 363 very quickly (approximately 1 millisecond) and thereafter allowing the fifth diode 364 to discharge voltage from the gate line 315 through the sixth resistor 365 to ground. It is contemplated that the preferred nominal values of the fifth and sixth resistors 362 and 365 as well as the fifth capacitor 363 are approximately 51 Ω, 1K Ω, and 1 μF, respectively.

Referring still to FIG. 3, the operations of the redundancy control circuit in combination with the transformer of the power supply is described herein. In the turn-on sequence, upon powering up the power supply, an AC waveform appears on the secondary winding 345 of the transformer 345 which is coupled to anodes of the first diode 330, the third diode 351 and the fourth diode 361. The AC waveform charges capacitors 334 and 335 through the first and second diodes 330–331 as well as the first and second inductors 332–333. This produces a main DC voltage output from the power supply. Since there is no gate voltage applied to the gate 313 of the power FET 310, the power FET 310 is initially in its "off" state. Rather, the voltage across the second capacitor 335 may be transferred through the internal diode 314 of the power FET 310 to the output terminal 320.

Concurrently, the AC waveform is applied to the anode of the third diode 351 which quickly charges the third capacitor 353 because the first resistor 352 has a small resistance and the third capacitor 353 has a small capacitance. As a result, the fourth capacitor 356 begins charging at a rate according to the time constant "K" derived by the product of the resistance of the third resistor 355 and the capacitance of the fourth capacitor 356. This produces a ramp $V_{gate}$ voltage applied to the gate 313 of the power FET 310. When Vgate is approximately 5–10 volts greater than the voltage of the source 311 of the power FET 310. The power FET 310 is turned on allowing load current to flow through the "on" resistance of the power FET 310 to flow through and produce the output voltage "Vout1". The reason is that the internal diode 314 is shorted so that the voltage drop across the "on" resistance at the FET 310 is much less than the internal diode 314.

Figure 1:
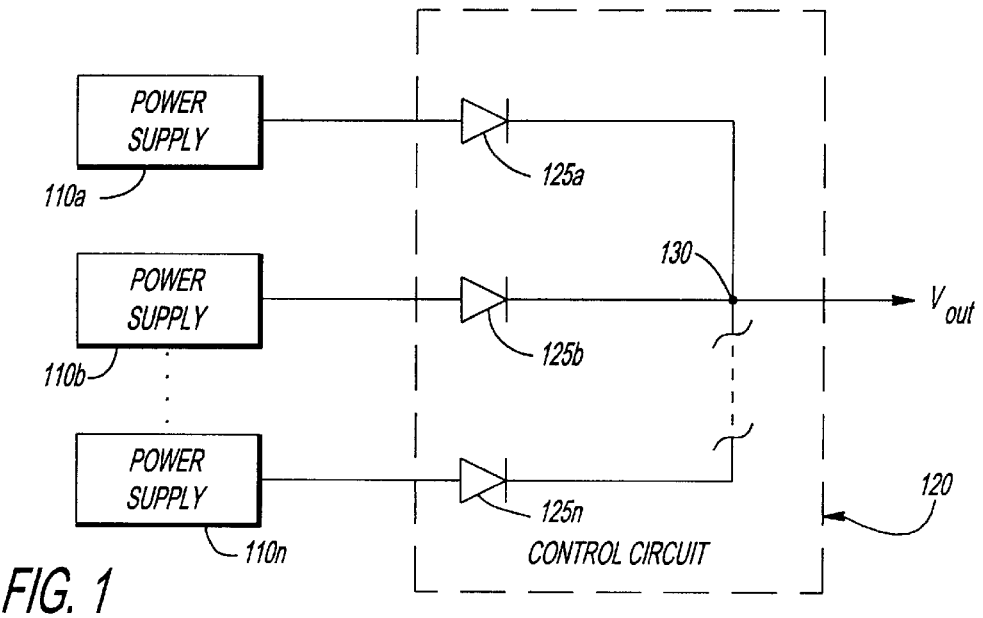
FIG. 1 is a circuit diagram of a conventional redundancy power supply system using OR'ing diodes as a control circuit to preclude the output voltage from substantially decreasing to zero volts if the power supply fails.

In the turn-off sequence, if the power supply fails for any reason, including a short in its diodes or capacitors (e.g., diodes 330–331, capacitors 334–335, etc.) the AC waveform appearing on the secondary winding 340 of the transformer 345 disappears. This immediately causes the sixth resistor 365 to discharge the voltage on the fifth capacitor 363. Thus, the fifth diode 364 now conducts voltage away from the gate 313 of the power FET 310 to ground through the sixth resistor 365. By turning off the power FET 310, the internal diode 314 now prevents current from flowing back into the power supply via the voltage bus line 321 thereby operating in a manner similar to the OR'ing diode as shown in FIG. 1. However, the voltage drop across the "on" resistance of the power FET 310 is substantially less than a voltage drop experienced from a discrete diode component.

Figure 4:
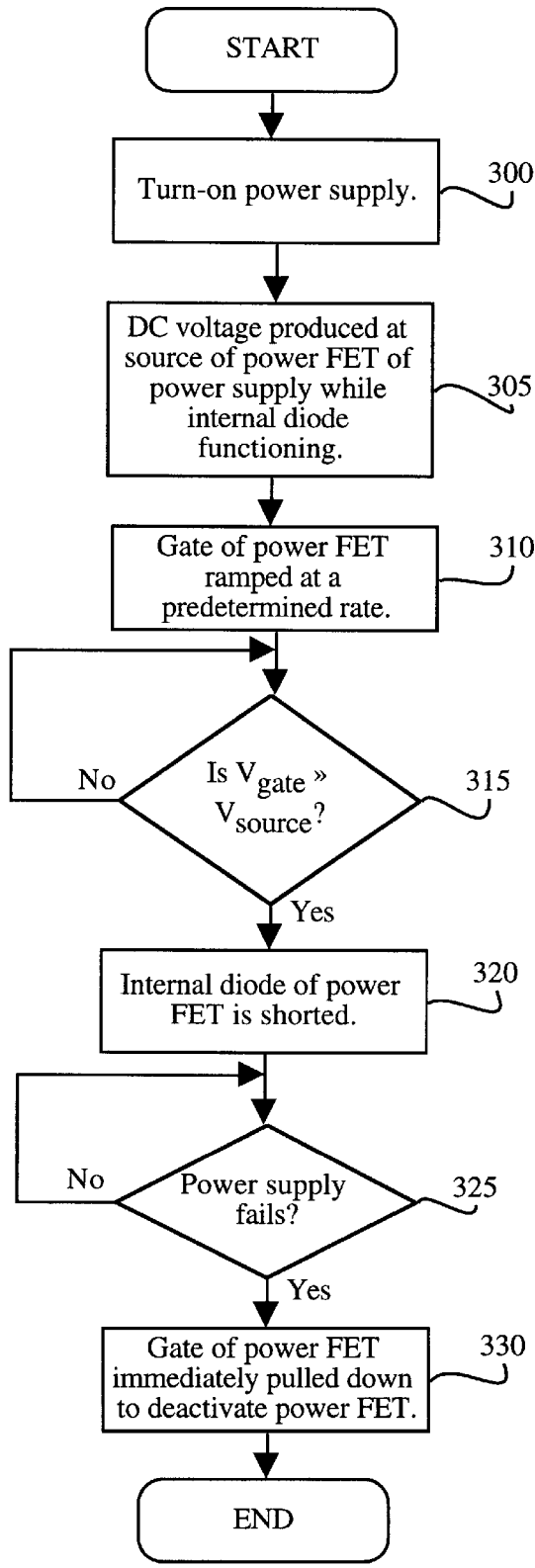
FIG. 4 is a flowchart illustrating the operations of the redundancy circuit.

Referring to FIG. 4, a flowchart illustrating the steps necessary for the discretionary redundancy circuit to perform certain operations in order to preclude current from flowing into a failed power supply is shown. First, the power supply has to be powered on causing an AC voltage to appear at the transformer T1 and the anodes of the first, third and fourth diodes (Step 300). In Step 305, a DC voltage is produced at the source of the power FET and load current flows through the internal diode of the power FET. Concurrently, in Step 310, the voltage at the gate "$V_{gate}$" of the power FET is ramped at a rate according to a time constant associated with the startup circuit. In Steps 315 and 320, once $V_{gate}$ is greater than the source voltage by a selected voltage, the internal diode 314 of the power FET is shunted by the low "on" resistance of the power FET thereby allowing the power supply to produce the full output voltage $V_{out1}$. Concurrently with the ramping of $V_{gate}$, the fourth diode charges the fifth capacitor so that the fifth diode is reversed biased so no current is flowing therethrough. In Step 325, in the event that the power supply fails and shuts off for whatever reason due to failure of one or more of its components or lack of an AC input, the voltage applied to the fifth capacitor is discharged by the sixth resistor because no voltage is applied to the cathode of the fourth diode. Such discharge is performed quickly in order to allow the voltage applied to the gate to be pulled towards ground through the diode. Since the fourth resistor is ten times greater in resistance than the sixth resistor, the sixth resistor essentially pulls the gate of the power FET within ten percent of ground almost immediately. This turns off the power FET and the presence of the internal diode within the power precludes current flowing back to the power supply via the drain of the power FET to its source since other power supplies coupled to the output terminal may still be in operation (Step 330).

In view of the foregoing specification, the invention has been described with reference to the specific embodiments. However, it is evident that various modifications and changes to the above-identified embodiments may be made without departing from the spirit and scope of the present invention as set forth in the claims which follow.

What is claimed is:

1. A circuit for controlling power output from a power supply, the circuit comprising:

a transistor having a source, a drain and a gate, the transistor including an internal diode that is forward biased between the source and drain;

a rectify and filter circuit coupled to said source of said transistor, said rectify and filter circuit converts alternating current (AC) power provided by the power supply into direct current (DC) power;

a start-up circuit coupled to said gate of said transistor, said start-up circuit turns on said transistor by placing said gate of said transistor at a voltage level exceeding a voltage applied to said source of said transistor; and a shut-down circuit coupled to said gate of said transistor and in parallel with said start-up circuit, said shut-down circuit turns off said transistor if the power supply fails.

2. The circuit according to claim 1, wherein said transistor is a Field Effect Transistor having an internal diode coupled between its source and drain, an anode of said internal diode being coupled to said source.

3. The circuit according to claim 1, wherein said rectify and filter circuit includes a first diode having an anode and a cathode, said anode of said first diode is coupled to a secondary winding of a transformer within the power supply;

a second diode having an anode and a cathode, said cathode of said second diode is coupled to said cathode of said first diode;

a first inductor coupled to said cathodes of said first and second diodes;

a second inductor coupled to said first inductor and to said source of said transistor;

a first capacitor coupled between said first and second inductors and ground; and a second capacitor coupled between said source of said transistor and said ground.

4. A redundant power supply system comprising:
a power line outputting a direct current (DC) power; and
a plurality of power supplies coupled to said power line, each of said plurality of power supplies including
  a transformer having at least a primary winding and a secondary winding to provide an alternating current (AC) power, and
  a power redundancy circuit coupled to said transformer and said power line, said power redundancy circuit including
    a field-effect transistor having a source, a drain and a gate, said drain of said field-effect transistor is coupled to said power line,
    a rectify and filter circuit coupled to said source of said field-effect transistor and said secondary winding, said rectify and filter circuit converts said AC power into said DC power,
    a start-up circuit coupled to said gate of said field-effect transistor, said start-up circuit turns on said field-effect transistor by placing said gate of said transistor at a voltage level exceeding a voltage applied to said source of said field-effect transistor, and
    a shut-down circuit coupled to said gate of said field-effect transistor and connected to the secondary winding, said shut-down circuit, in parallel with the start-up circuit, turns off said field-effect transistor if the power supply fails.

5. The redundant power supply system according to claim 4, wherein said field-effect transistor includes an internal diode coupled between said source and said drain, an anode of said internal diode being coupled to said source.

6. The redundant power supply system according to claim 5, wherein said rectify and filter circuit of said power redundancy circuit includes
  a first diode having an anode and a cathode, said anode of said first diode is coupled to said secondary winding of said transformer within the power supply;
  a second diode having an anode and a cathode, said cathode of said second diode is coupled to said cathode of said first diode;
  a first inductor coupled to said cathodes of said first and second diodes;
  a second inductor coupled to said first inductor and to said source of said field-effect transistor;
  a first capacitor coupled between said first and second inductors and ground; and
  a second capacitor coupled between said source of said field-effect transistor and said ground.

7. A circuit for controlling power output from a power supply, the circuit comprising:
  a field-effect transistor having a source, drain and gate;
  conversion means for rectifying alternating current (AC) power provided by the power supply into a direct current (DC) power and filtering said DC power, said conversion means coupled to said field-effect transistor and the power supply;
  power means for providing said DC power when said field-effect transistor is turned on, said power means coupled to said drain of said field-effect transistor;
  start-up means for slowly turning on said field-effect transistor by placing said gate of said field-effect transistor at a voltage level exceeding a voltage applied to said source of said field-effect transistor, said start-up means coupled to said gate of said field-effect transistor and the power supply; and
  shut-down means for turning off said field-effect transistor if the power supply fails, said shut-down means coupled to said gate of said field-effect transistor and the power supply, the shut-down means placed in parallel with the start-up means.

8. The circuit according to claim 7, wherein said field-effect transistor includes an internal diode coupled between said source and said drain, an anode of said internal diode being coupled to said source.

9. The circuit according to claim 7, wherein said rectify and filter means includes
  a first diode having an anode and a cathode, said anode of said first diode is coupled to a secondary winding of a transformer within the power supply;
  a second diode having an anode and a cathode, said cathode of said second diode is coupled to said cathode of said first diode;
  a first inductor coupled to said cathodes of said first and second diodes;
  a second inductor coupled to said first inductor and to said source of said field-effect transistor;
  a first capacitor coupled between said first and second inductors and ground; and
  a second capacitor coupled between said source of said field-effect transistor and said ground.

10. The circuit according to claim 7, wherein said start-up circuit includes
  a diode having an anode and a cathode, said anode of said diode coupled to a secondary winding of a transformer of the power supply;
  a first resistor having a first lead and a second lead, said first lead of said first resistor coupled to said cathode of said diode;
  a first capacitor coupled between said second lead of said first resistor and ground;
  a second resistor coupled in parallel with said first capacitor;
  a third resistor having a first lead and a second lead, said first lead of said third resistor coupled to said first and second resistors and said first capacitor;
  a second capacitor coupled between said second lead of said third resistor and ground; and
  a fourth resistor coupled to said second capacitor, said third resistor and said gate of said field-effect transistor.

11. The circuit according to claim 7, wherein said shut-down circuit including
  a diode having an anode and a cathode, said anode of said diode coupled to a secondary winding of a transformer of the power supply;
  a first resistor having a first lead and a second lead, said first lead of said first resistor coupled to said cathode of said diode;
  a first capacitor coupled between said second lead of said first resistor and ground;
  a second resistor coupled in parallel with said first capacitor; and
  a second diode having an anode and a cathode, said cathode of said second diode coupled to said second resistor and said anode of said second diode coupled to said gate of said field-effect transistor.

12. A redundant power supply system comprising:
a power line outputting a direct current (DC) power; and
a plurality of power supplies coupled to said power line, each of said plurality of power supplies including a transformer including a primary winding and a secondary winding to provide an alternating current (AC) power, and a power redundancy circuit coupled to said transformer and said power line, said power redundancy circuit including a field-effect transistor having a source, drain and gate, said drain of said field-effect transistor coupled to said power line, conversion means for rectifying said AC power into said DC power and filtering said DC power, said conversion means coupled to said secondary winding of said transformer and to said field-effect transistor, start-up means for turning on said field-effect transistor by placing said gate of said field-effect transistor at a voltage level exceeding a voltage applied to said source of said field-effect transistor, said start-up means coupled to said gate of said field-effect transistor and to said secondary winding of said transformer, and shut-down means for turning off said field-effect transistor if the power supply fails, said shut-down means in parallel with said start-up means, coupled to said gate of said field-effect transistor and to said secondary winding of said transformer.

13. The redundant power supply system according to claim 12, wherein said field-effect transistor includes an internal diode coupled between said source and said drain, an anode of said internal diode coupled to said source.

14. The redundant power supply system according to claim 12, wherein said conversion means of said power redundancy circuit includes a first diode having an anode and a cathode, said anode of said first diode coupled to said secondary winding of said transformer within the power supply;

a second diode having an anode and a cathode, said cathode of said second diode coupled to said cathode of said first diode;

a first inductor coupled to said cathodes of said first and second diodes;

a second inductor coupled to said first inductor and to said source of said field-effect transistor;

a first capacitor coupled between said first and second inductors and ground; and a second capacitor coupled between said source of said field-effect transistor and said ground.

15. The redundant power supply system according to claim 12, wherein said start-up means of said power redundancy circuit includes a diode having an anode and a cathode, said anode of said diode coupled to said secondary winding of said transformer of the power supply;

a first resistor having a first lead and a second lead, said first lead of said first resistor coupled to said cathode of said diode;

a first capacitor coupled between said second lead of said first resistor and ground;

a second resistor coupled in parallel with said first capacitor;

a third resistor having a first lead and a second lead, said first lead of said third resistor is coupled to said first and second resistors and said first capacitor;

a second capacitor coupled between said second lead of said third resistor and ground; and a fourth resistor coupled to said second capacitor, said third resistor and said gate of said field-effect transistor.

16. The redundant power supply system according to claim 12, wherein said shut-down means of said power redundancy circuit including a diode having an anode and a cathode, said anode of said diode coupled to said secondary winding of said transformer of the power supply;

a first resistor having a first lead and a second lead, said first lead of said first resistor coupled to said cathode of said diode;

a first capacitor coupled between said second lead of said first resistor and ground;

a second resistor coupled in parallel with said first capacitor; and a second diode having an anode and a cathode, said cathode of said second diode is coupled to said second resistor and said anode of said second diode coupled to said gate of said field-effect transistor.

17. A circuit for controlling power output from a power supply, the circuit comprising:

a transistor;

a rectify and filter circuit coupled to the transistor;

a start-up circuit coupled to the transistor, the start-up circuit including a diode having an anode and a cathode, the anode of the diode coupled to the power supply, a first resistor coupled to the cathode of the diode, a first capacitor coupled to the first resistor and ground, a second resistor coupled in parallel with the first capacitor, a third resistor coupled to the first resistor, the second resistors and the first capacitor, a second capacitor coupled between the third resistor and ground, and a fourth resistor coupled to the second capacitor, the third resistor and the gate of the transistor; and a shut-down circuit coupled to the transistor, the shut-down circuit turning off the transistor if the power supply fails.

18. A circuit for controlling power output from a power supply, the circuit comprising:

a transistor;

a rectify and filter circuit coupled to the transistor;

a start-up circuit coupled to the transistor; and a shut-down circuit coupled to the transistor, the shut-down circuit, turning off the transistor if the power supply fails, including a first diode having an anode and a cathode, the anode of the first diode coupled to the power supply, a first resistor coupled to the cathode of the first diode, a first capacitor coupled to the first resistor and ground, a second resistor coupled in parallel with the first capacitor, and a second diode having an anode and a cathode, the cathode of the second diode coupled to the second resistor, and the anode of the second diode coupled to the transistor.

19. A redundant power supply system comprising:

a power line;

a plurality of power supplies coupled to said power line, at least one of the plurality of power supplies including a transformer, and a power redundancy circuit coupled to said transformer and said power line, said power redundancy circuit including a transistor coupled to said power line,
a rectify and filter circuit coupled to said transistor, and
a start-up circuit including
- a diode having an anode and a cathode, said anode of said diode is coupled to said transformer,
- a first resistor having a first lead and a second lead, said first lead of said first resistor is coupled to said cathode of said diode,
- a first capacitor coupled between said second lead of said first resistor and ground,
- a second resistor placed in parallel with said first capacitor,
- a third resistor having a first lead and a second lead, said first lead of said third resistor is coupled to said first resistor, said second resistor and said first capacitor,
- a second capacitor coupled between said second lead of said third resistor and ground, and
- a fourth resistor coupled to said second capacitor, said third resistor and said transistor.

20. A redundant power supply system comprising
a power line;
a plurality of power supplies coupled to said power line, at least one of the plurality of power supplies including
a transformer, and
a power redundancy circuit coupled to said transformer and said power line, said power redundancy circuit including
a transistor coupled to said power line,
a rectify and filter circuit coupled to said transistor, and
a shut-down circuit coupled to said transistor, said shut-down circuit turns off said transistor if the power supply fails and includes
- a diode having an anode and a cathode, said anode of said diode is coupled to said transformer,
- a first resistor having a first lead and a second lead, said first lead of said first resistor is coupled to said cathode of said diode,
- a first capacitor coupled between said second lead of said first resistor and ground,
- a second resistor placed in parallel with said first capacitor, and
- a second diode having an anode and a cathode, said cathode of said second diode is coupled to said second resistor and said anode of said second diode is coupled to said transistor.

* * * * *